(12) United States Patent
Jana et al.

(10) Patent No.: US 9,384,230 B2
(45) Date of Patent: *Jul. 5, 2016

(54) METHOD AND APPARATUS FOR AGGREGATING AND TRANSLATING REAL-TIME USER INFORMATION TO UPDATE SOCIAL NETWORK PROFILES

(71) Applicant: AT&T Intellectual Property I, L.P., Atlanta, GA (US)

(72) Inventors: Rittwik Jana, Parsippany, NJ (US); John F. Murray, Denville, NJ (US); Christopher W. Rice, Parsippany, NJ (US); Ron Shacham, Passaic, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/331,075

(22) Filed: Jul. 14, 2014

(65) Prior Publication Data

US 2014/0351230 A1 Nov. 27, 2014

Related U.S. Application Data

(63) Continuation of application No. 12/634,360, filed on Dec. 9, 2009, now Pat. No. 8,782,022.

(51) Int. Cl.
*G06F 17/30* (2006.01)
*H04L 12/58* (2006.01)
*H04L 29/08* (2006.01)
*G06Q 10/10* (2012.01)

(52) U.S. Cl.
CPC .... *G06F 17/30365* (2013.01); *G06F 17/30864* (2013.01); *G06F 17/30867* (2013.01); *G06Q 10/10* (2013.01); *H04L 12/588* (2013.01); *H04L 12/5885* (2013.01); *H04L 51/32* (2013.01); *H04L 67/22* (2013.01); *H04L 67/30* (2013.01)

(58) Field of Classification Search
CPC .... G06F 17/30365–17/30383; G06F 3/04842; G06F 17/30864; G06F 17/30867; H04L 12/588; H04L 12/5885; H04L 67/22; H04L 67/30; H04L 51/32; H04W 12/00
See application file for complete search history.

(56) References Cited

U.S. PATENT DOCUMENTS 7,716,140 B1 * 5/2010 Nielsen ............... G06F 21/6245
705/319
8,782,022 B2 7/2014 Jana et al.
(Continued)

FOREIGN PATENT DOCUMENTS

WO WO 2008/151050 * 12/2008

OTHER PUBLICATIONS

Miluzzo et al. (CenceMe—Injecting Sensing Presence into Social Networking Application, EuroSSC 2007, LNCS 4793, pp. 1-28, 2007).
(Continued)

*Primary Examiner* — Srirama Channavajjala (57) ABSTRACT

A method, computer readable medium and apparatus for automatically updating social network profiles are disclosed. For example, the method receives one or more inputs from a subscriber, processes the one or more inputs in accordance with a policy defined by the subscriber to produce an update about the subscriber and publishes the update about the subscriber on one or more social network profiles associated with the subscriber.

20 Claims, 4 Drawing Sheets

(56) References Cited

U.S. PATENT DOCUMENTS

| | | | |
|---|---|---|---|
| 2004/0128301 A1 | 7/2004 | Thint et al. | |
| 2006/0161599 A1* | 7/2006 | Rosen | G06F 17/3087 |
| 2007/0162322 A1* | 7/2007 | Shahine | G06Q 10/1093 |
| | | | 705/7.18 |
| 2007/0271379 A1* | 11/2007 | Carlton | G06F 21/6263 |
| | | | 709/225 |
| 2008/0098313 A1* | 4/2008 | Pollack | G06F 3/048 |
| | | | 715/753 |
| 2008/0302867 A1* | 12/2008 | Holberg | G06Q 30/02 |
| | | | 235/375 |
| 2009/0070334 A1* | 3/2009 | Callahan | G06F 21/604 |
| 2010/0094878 A1* | 4/2010 | Soroca | G06F 17/30035 |
| | | | 707/748 |
| 2010/0228590 A1* | 9/2010 | Muller | G06Q 10/10 |
| | | | 705/319 |
| 2011/0047229 A1 | 2/2011 | Sinha et al. | |
| 2013/0006904 A1* | 1/2013 | Horvitz | G06Q 10/10 |
| | | | 706/46 |

OTHER PUBLICATIONS

Belinsky E., et al.,"PASTA: Deriving Rich Presence for Converged Telecommunications Network Applications", COMSWARE 2007.

Vakil, M., "Microsoft Office Communicator 2007: The Enhanced Presence Model", White Paper, Sep. 2007.

Shacham, R., et al., "Composition for Enhanced SIP Presence", ISCC 2007.

Miluzzo, E., et al., "Sensing Meets Mobile Social Networks: The Design, Implementation and Evaluation of the CenceMe Application," SenSys '08, Nov. 2008, pp. 337-350, Raleigh, North Carolina.

N. Banerjee et. al, "R-U-In?—Exploiting Rich Presence and Converged Communications for Next-generation Activity-oriented Social Networking," IEEE MDM 2009.

Bergmann, O., "A Framework for Aggregation of Presence Information Based on User-Provisioned Rules", Doctoral Thesis, University of Bremen, Bremen, Germany, Nov. 2006.

* cited by examiner

METHOD AND APPARATUS FOR AGGREGATING AND TRANSLATING REAL-TIME USER INFORMATION TO UPDATE SOCIAL NETWORK PROFILES

This application is a continuation of U.S. patent application Ser. No. 12/634,360, filed Dec. 9, 2009, now U.S. Pat. No. 8,782,022, which is herein incorporated by reference in its entirety.

BACKGROUND

The popularity of social networking sites such as Facebook®, Twitter®, MySpace®, LinkedIn®, etc., are increasing. Social networking sites allow a subscriber to share personal content and information, status or location information. In doing so, the subscriber must log into each site and manually enter what the content they want to share, their personal information or any updates to what they are doing.

In other words, a common feature of these social networking sites is that the subscriber must repeatedly and manually input information to update these social networking sites. In other words, the social network sites are only as good as the most recent information that is posted by the subscriber. This requires a large commitment of time and effort from the subscriber.

However, repeatedly updating the subscriber information in these social networking sites is a laborious process. Eventually, this cumbersome process leads to a disinterest in these social network sites as subscribers become lazy or simply do not feel like constantly updating their information. This leads to stale information on these social network sites.

SUMMARY

In one embodiment, the present disclosure discloses a method, computer readable medium and apparatus for automatically updating social network profiles are disclosed. For example, the method receives one or more inputs from a subscriber, processes the one or more inputs in accordance with a policy defined by the subscriber to produce an update about the subscriber and publishes the update about the subscriber on one or more social network profiles associated with the subscriber.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
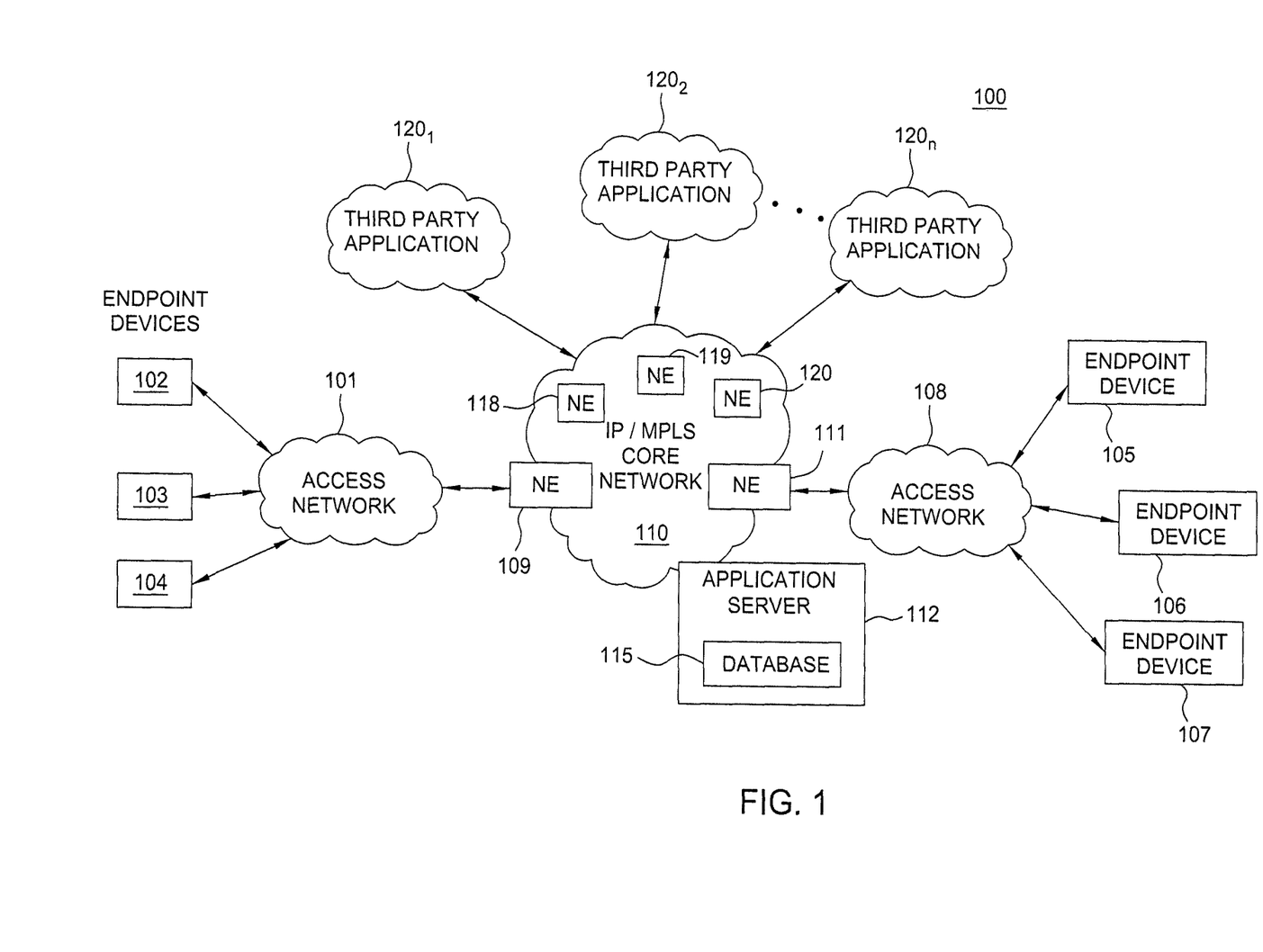
FIG. 1 illustrates an exemplary network related to the present disclosure.

The present disclosure broadly discloses a method and apparatus for automatically aggregating and translating real-time user information to update social network profiles. FIG. 1 is a block diagram depicting an exemplary network 100 related to the current disclosure. Exemplary networks include cellular networks, Internet protocol networks, packet networks, and the like.

FIG. 1 is a block diagram depicting an exemplary packet network 100 related to the current disclosure. Exemplary packet networks include packet networks, e.g., Internet Protocol (IP) networks, Asynchronous Transfer Mode (ATM) networks, Frame-Relay networks, and the like. An IP network is broadly defined as a network that uses Internet Protocol such as IPv4 or IPv6, and the like to exchange data packets.

In one embodiment, the packet network may comprise a plurality of endpoint devices 102-104 configured for communication with a core packet network 110 (e.g., an IP based core backbone network supported by a service provider) via an access network 101. Similarly, a plurality of endpoint devices 105-107 are configured for communication with the core packet network 110 via an access network 108. The network elements (NEs) 109 and 111 may serve as gateway servers or edge routers (e.g., broadly as a border element) for the network 110.

The endpoint devices 102-107 may comprise customer endpoint devices such as personal computers, laptop computers, Personal Digital Assistants (PDAs), servers, routers, and the like. The access networks 101 and 108 serve as a means to establish a connection between the endpoint devices 102-107 and the NEs 109 and 111 of the IP/MPLS core network 110. The access networks 101 and 108 may each comprise a Digital Subscriber Line (DSL) network, a broadband cable access network, a Local Area Network (LAN), a Wireless Access Network (WAN), and the like.

Some NEs (e.g., NEs 109 and 111) reside at the edge of the core infrastructure and interface with customer endpoints over various types of access networks. An NE that resides at the edge of a core infrastructure is typically implemented as an edge router, a media gateway, a border element, a firewall, a switch, and the like. An NE may also reside within the network (e.g., NEs 118-120) and may be used as a mail server, honeypot, a router, or like device.

The IP/MPLS core network 110 may also comprise an application server 112 that contains a database 115. The application server 112 may comprise any server or computer that is well known in the art, and the database 115 may be any type of electronic collection of data that is also well known in the art. The application server 112 embodies as hardware various modules and components that automatically aggregate and translate real-time user information to update social network profiles discussed below. It should be noted that one or more application servers 112 may be used to deploy each one of the various modules and components that perform the automated end-to-end content tracking. In addition, it should be noted that the application server 112 may be physically within the IP/MPLS core network 110 or may be offloaded outside of the IP/MPLS core network 110 and operated by a third party.

In one embodiment, one or more third party applications $120_1$-$120_n$ (hereinafter collectively referred to as third party applications 120) may be in communication with the IP/MPLS core network 110. For example, the third party applications 120 may be social network websites such as Facebook®, Twitter®, LinkedIn®, MySpace® and the like. Social network websites are broadly described as any website that typically allows a user to share personal information or content with other users via these websites. The endpoints 102-107 can access the third party applications 120 via the IP/MPLS core network 110.

In one embodiment, each of the third party applications 120 may have their own application server (not shown) for storing each user's profile. The user profile includes information about the user that can be updated and displayed for other users on the third party application 120. In addition, each third party application 120 may use a different application programming interface (API) or programming protocol.

Typically, these social network websites require the user to manually update or upload their personal information, content or status information. This becomes a laborious and time consuming process that can lead to disinterest as the user becomes lazy or simply does not feel like constantly updating their information. The present disclosure resolves this problem.

It should be noted that although only six endpoint devices, two access networks, and five network elements are depicted in FIG. 1, the communication system 100 may be expanded by including additional endpoint devices, access networks, network elements, application servers or third party applications without altering the scope of the present disclosure. The current disclosure discloses automatically aggregating and translating real-time user information to update social network profiles in a network, e.g., the network 100 illustrated in FIG. 1 and as described above.

Figure 2:
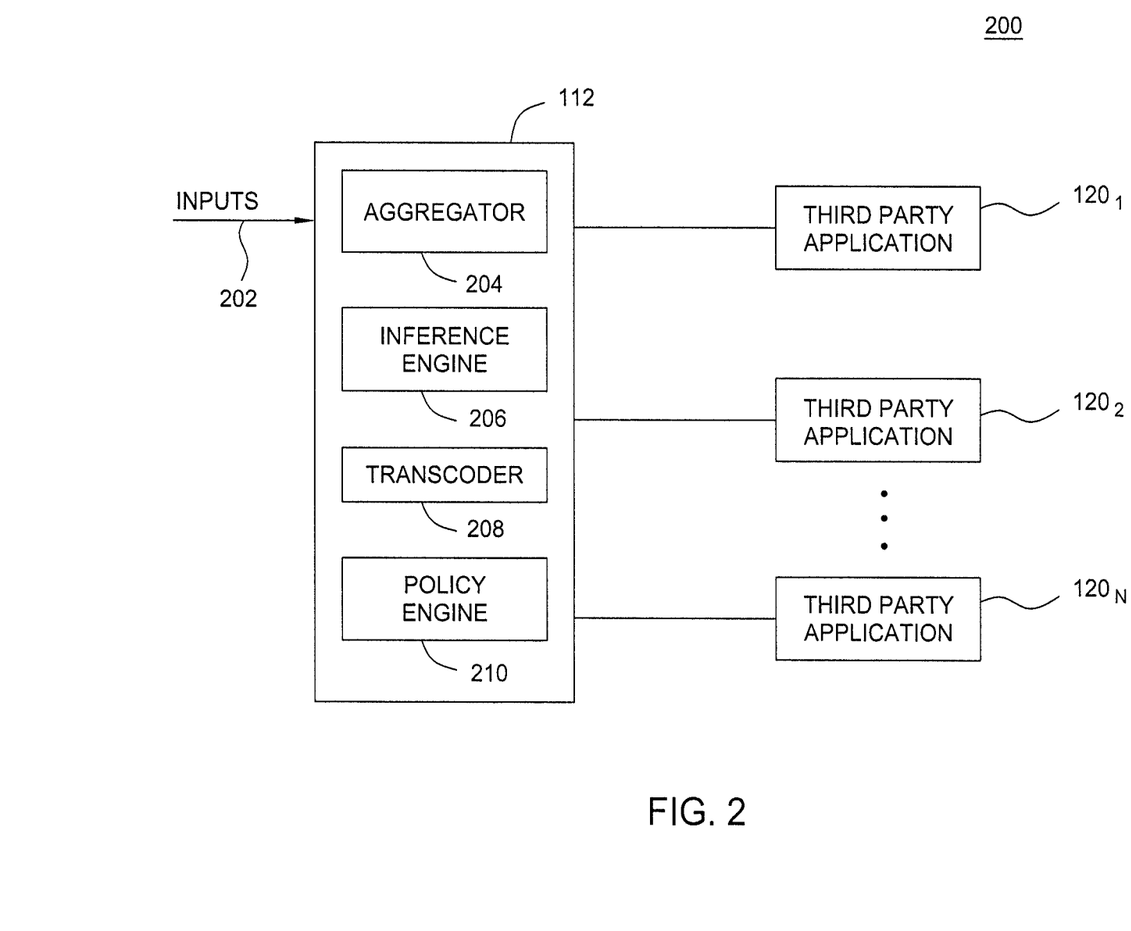
FIG. 2 illustrates a high level block diagram of the present disclosure.

FIG. 2 illustrates a high level block diagram of one embodiment of a system 200 for automatically aggregating and translating real-time user information to update social network profiles in a network. In one embodiment, the system 200 includes the application server 112 and the third party applications $120_1$ to $120_n$.

In one embodiment, the application server 112 includes an aggregator 204, an inference engine 206, a transcoder 208 and a policy engine 210. Although FIG. 2 illustrates the modules 204, 206, 208 and 210 in a single application server 112, it should be noted that the one or more of the modules 204, of the modules 204, 206, 208 and 210 may be embodied in multiple application servers 112.

The aggregator 204 continuously receives one or more inputs 202. The one or more inputs 202 may be rich presence information associated with a user. For example, the aggregator 204 continuously receives information about the user's location, calendar and communication activities. Thus, the rich presence information may include a user's current latitude and longitude information, a user's appointments and schedules, a user's phone call log, emails that the user has sent, text messages that the user has sent, what television shows the user is watching and the like.

Metadata associated with various communication activities and location information may also be collected. For example, the metadata may include a particular phone number or email address associated with a communication, a time the communication was made and so forth.

Notably, the inputs are received automatically based upon detected activities of the user. In other words, no manual inputs are required from the user. For example, when a user moves the user's mobile device may provide Global Positioning Satellite (GPS) location information to the aggregator 204. In another example, when the user makes a phone call, all of the information associated with the phone call can be provided to the aggregator 204.

In another embodiment, the one or more inputs 202 may be received from updates to the user's social network profile in one of the social network sites of a third party application 120. For example, another user may comment or post something on the user's social network profile. The aggregator may also collect this type of input 202.

The inference engine 206 is programmed to make intelligent inferences based upon the one or more inputs 202 received by the aggregator 204. For example, the aggregator 204 may receive and input that the user is at a particular longitude and latitude location at particular time. The inference engine 206 may determine that the longitude and latitude location correlations to a local restaurant. The inference engine 206 further receives inputs that the location information is provided at noon during a weekday. The inference engine 206 may be programmed to conclude that the user is currently at lunch.

In another example, the inference engine 206 may receive a user's location information at 6:00 PM at night. The location information may correspond to a local university. The inference engine 206 may further receive periodic updates of the user's location and realize that the user has not changed location within the last thirty minutes. As a result, the inference engine 206 may conclude that the user is currently attending an evening class at the local university.

In another example, the inference engine 206 may receive an input from the aggregator 204 that the user has made a phone call to a particular telephone number at 1:00 PM. The inference engine 206 may look up the telephone number to see that the telephone number is associated with a conference bridge. The inference engine 206 may also receive information from the aggregator 204 that the user is scheduled to be in conference room 200 at 1:00 PM based upon the user's calendar. As a result, the inference engine 206 may conclude that the user is probably on a conference call at work.

In another example, the inference engine 206 may receive an input from the aggregator 204 that they are currently watching channel 5 at 7:00 PM. For example, a cable set top box may be in communication with the network and provide channel information, whether the set top box is turned on and similar information to the aggregator 204. The inference engine 206 may correlate channel 5 at 7:00 PM to a particular television program and conclude that the user is watching that particular program.

Similar inferences may be made by the inference engine 206 based on other activity, communication and information inputs received by the aggregator 204. The above inferences are provided only as examples and not intended to be limiting. It should be noted that the inference engine 206 is programmed to be able to make inferences based upon any type of inputs that may be collected automatically from the user.

The inferences made by the inference engine 206 are used to create an update for the user's social network profile associated with one or more of the third party applications 120. For example, if the inference engine determines that the user is at a restaurant eating lunch, the update may be "out to lunch". This update can then be published on the user's social network profile (e.g., a status on the user's Facebook® page). In one embodiment, the application server 112 may have a processor, a memory and program instructions stored in the memory for automatically publishing the update created by the inference engine 206.

The transcoder 208 translate each of the inferences made by the inference engine 206 into a format that is compatible with any of the API's used by the third party applications 120. For example, if the user has a social network profile on Facebook®, MySpace® and Twitter®, the transcoder 208 may translate the inferences made by the inference engine 206 into a format compatible with the different API's of Facebook®, MySpace® and Twitter®.

The policy engine 210 includes a user defined policy. The user defined policy includes information on how the information generated by the inference engine 206 should be published or updated in any one of the users social network profile. As noted above, the inference engine 206 is a powerful module that can make very specific conclusions about a user based upon inputs collected by the aggregator 204. For example, the inference engine 206 based upon a location and time of day may determine that the user is out to lunch at a specific restaurant. However, if the user is at work, the user may not want everyone to know their specific location. As a result, the user may configure the inference engine 206 to abstract the inferences made by the inference engine to a desired level, e.g., the update should simply state "out to lunch," rather than the specific location or restaurant the user is visiting and how long they have been there.

In addition, the user may set the level of abstraction for different groups of people. For example, the user may set a low level of abstraction for close friends and family. As a result, very specific updates may be provided to close friends and family that access the user's social network profiles. In stark contrast, the user may set a very high level of abstraction for acquaintances that the user is not close to or co-workers that access the user's social network profiles. As a result, only general information would be provided to these acquaintances.

The user defined policy may also include a trigger for when the third party applications should be updated. For example, the user may configure the trigger to be whenever any of their information changes, periodically (e.g., every 30 minutes, every hour, every day, and the like) or a combination of both (e.g. every 30 minutes only if some information has changed). As a result, the aggregator 204 may continuously receive inputs and the inference engine 206 may continuously make inferences based upon the inputs. However, the inferences may be used to update one or more social network profiles associated with the user on the third party applications 120 only when the trigger is reached.

The user defined policy may also be used to control which third party applications should be updated. For example, the user may only want Facebook® to be updated with the inferences made by the inference engine 206.

The policy engine 210 may also include security policies. For example, the security policies include whether the inferences that are transmitted to the third party applications 120 should be encrypted. In another example, the user may request that the application server 112 notify the user each time a social network profile of the user on a third party application is about to be updated. The notification could also ask for confirmation from the user. The above scenarios are only provided as examples and it should be noted that any type of security policies may be defined in the policy engine 210.

In one embodiment, the functions provided by the system 200 may be a service provided by a service provider of the communications network 100 or a third party service provider. In addition, the services may be "opt-in" type services. That is, the user may either accept or decline to receive the services described above.

Figure 3:
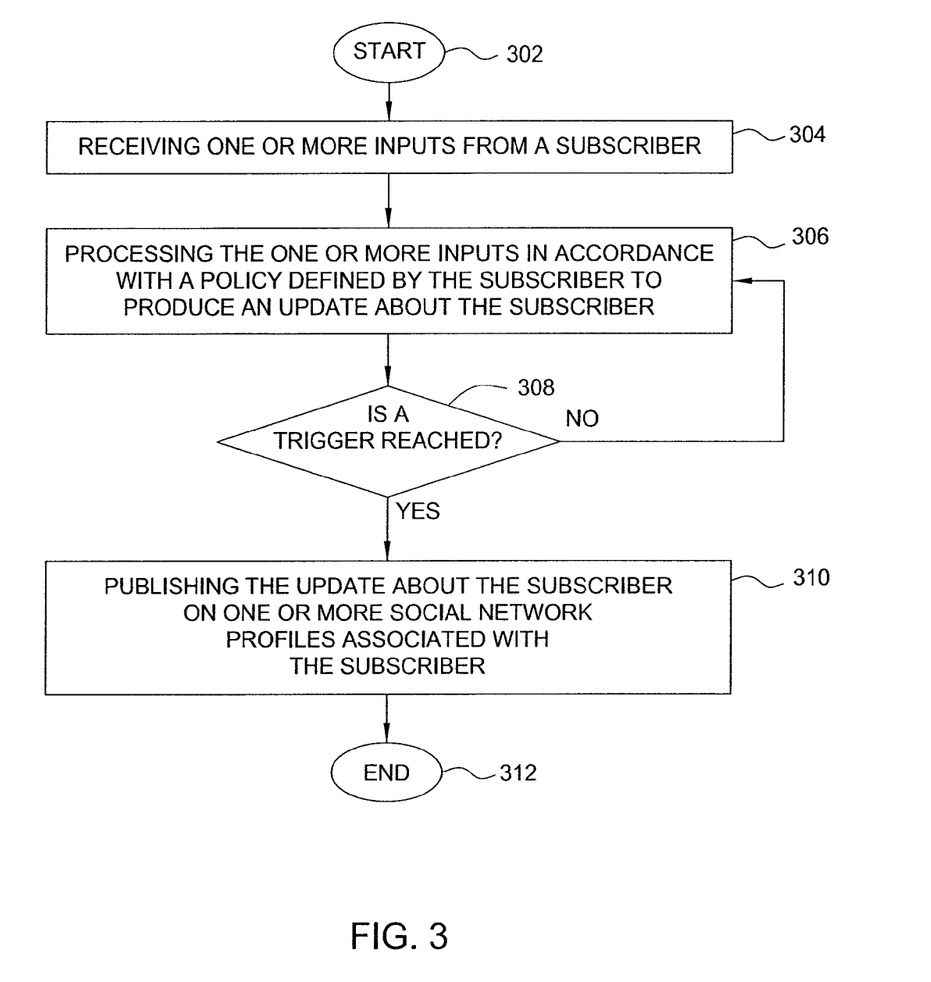
FIG. 3 illustrates a flowchart of a method for automatically updating social networking profiles.

FIG. 3 illustrates a flowchart of a method 300 for automatically updating social network profiles. In one embodiment, one or more steps of the method 300 may be implemented by the application server 112 having one or more modules or components of the system 200 or a general purpose computer having a processor, a memory and input/output devices as discussed below with reference to FIG. 4.

The method 300 begins at step 302. At step 304, the method 300 receives one or more inputs from a subscriber. As discussed above, the method 300 collects various inputs from a subscriber or user about their location or communication activities. This information type of information is also known as rich presence information. In one embodiment, the one or more inputs may be received by the aggregator 204.

Notably, the method 300 automatically receives the one or more inputs based upon the detected activities of the subscriber. In other words, the subscriber is not required to enter any information about what they are doing or where they are. The rich presence information is automatically collected from whatever device the subscriber is using or interacting with.

At step 306, the method 300 processes the one or more inputs in accordance with a policy defined by the subscriber to produce an update about the subscriber. For example, the inference engine 206 may make various inferences about the subscriber based upon the one or more inputs collected by the aggregator 204. The inferences concluded by the inference engine may be used as an update for a social network profile associated with the subscriber, e.g., a status update on Facebook®.

The subscriber or user may define how the inferences should be published in the update. As discussed above, the user can define a level of abstraction for the inferences produced by the inference engine 206 via the policy engine 210. For example, if the inference engine 206 determines that the subscriber is in a class at Rutgers University, Newark Campus at 7:00 PM, the subscriber may only want the inference engine 206 to produce the update to specify that the subscriber is in class without divulging the specific location (i.e. Rutgers University, Newark campus and the specific building and address of the subscriber's location).

At step 308, the method 300 determines whether a trigger is reached. As discussed above, the subscriber may also define a trigger in the policy engine 210. The trigger determines if and when the subscriber's social network profiles associated with one or more of the third party applications are updated. For example, the trigger may be whenever information about the subscriber changes (e.g., the subscriber's location information changes or a the subscriber initiates a new phone call), periodically (e.g., every 30 minutes) or a combination (e.g., every 30 minutes only if the subscriber's location changes).

If the trigger is not reached at step 308, the method 300 returns to step 304 and continues to receive one or more inputs and process the received one or more inputs. However, if the trigger is reached at step 308, the method continues to step 310.

At step 310, the method 300 publishes the update about the subscriber on one or more social network profiles associated with the subscriber. For example, the application server 112 automatically updates a subscriber's Facebook® profile with the update produced by the inference engine 206. Notably, the method 300 does not require any interaction by the subscriber or any manually inputs from the subscriber to update the subscriber's social network profile. The method 300 ends at step 310.

It should be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in the accompanying Figures that recite a determining operation or involve a decision, do not necessarily require that both branches of the determining operation be practiced. In other words, one of the branches of the determining operation can be deemed as an optional step.

Figure 4:
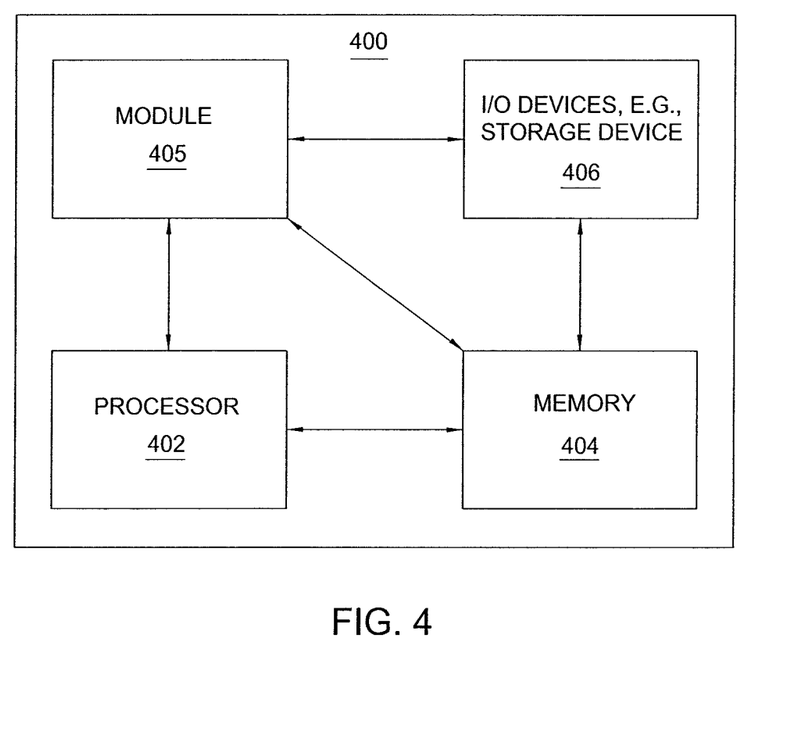
FIG. 4 illustrates a high-level block diagram of a general-purpose computer suitable for use in performing the functions described herein.

FIG. 4 depicts a high-level block diagram of a general-purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for automatically updating social network profiles, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present disclosure can be implemented in software and/or in a combination of software and hardware, e.g., using application specific integrated circuits (ASIC), a general purpose computer or any other hardware equivalents. In one embodiment, the present module or process 405 for automatically updating social network profiles can be loaded into memory 404 and executed by processor 402 to implement the functions as discussed above. As such, the present method 405 for automatically updating social network profiles (including associated data structures) of the present disclosure can be stored on a computer readable storage medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for updating a social network profile, the method comprising:
   receiving, by a processor, rich presence information associated with a subscriber, wherein the rich presence information includes location information associated with the subscriber, calendar information of the subscriber and communication activities of the subscriber;
   processing, by the processor, the rich presence information in accordance with a policy defined by the subscriber, wherein the policy defines a level of abstracting to produce an update about the subscriber;
   abstracting, by the processor, specific information in the update into general information to generate a modified update, wherein the abstracting transforms the specific information into the general information; and
   publishing, by the processor, automatically the modified update about the subscriber on the social network profile associated with the subscriber.

2. The method of claim 1, wherein the receiving is performed automatically based upon a detected activity of the subscriber.

3. The method of claim 1, wherein the processing is performed by the processor of an inference engine.

4. The method of claim 1, wherein the publishing comprises transcoding the modified update about the subscriber into a format compatible with an application programming interface of the social network profile associated with the subscriber.

5. The method of claim 1, wherein the publishing is performed when a trigger is reached.

6. The method of claim 1, wherein the location information comprises latitude and longitude information.

7. The method of claim 1, wherein the location information comprises global positioning satellite information.

8. The method of claim 1, wherein the calendar information comprises appointments of the subscriber.

9. The method of claim 1, wherein the communication activities comprise phone call activities, email activities, and text messaging activities.

10. The method of claim 9, wherein the rich presence information further comprises metadata associated with the communication activities.

11. The method of claim 10, wherein the metadata comprises a phone number.

12. The method of claim 10, wherein the metadata comprises an email address.

13. A non-transitory computer-readable medium storing a plurality of instructions which, when executed by a processor, cause the processor to perform operations for updating a social network profile, the operations comprising:
   receiving rich presence information associated with a subscriber, wherein the rich presence information includes location information associated with the subscriber, calendar information of the subscriber and communication activities of the subscriber;
   processing the rich presence information in accordance with a policy defined by the subscriber, wherein the policy defines a level of abstracting to produce an update about the subscriber;
   abstracting specific information in the update into general information to generate a modified update, wherein the abstracting transforms the specific information into the general information; and
   publishing automatically the modified update about the subscriber on the social network profile associated with the subscriber.

14. The non-transitory computer-readable medium of claim 13, wherein the receiving is performed automatically based upon a detected activity of the subscriber.

15. The non-transitory computer-readable medium of claim 13, wherein the publishing comprises transcoding the modified update about the subscriber into a format compatible with an application programming interface of the social network profile associated with the subscriber.

16. The non-transitory computer-readable medium of claim 13, wherein the publishing is performed when a trigger is reached.

17. The non-transitory computer-readable medium of claim 13, wherein the location information comprises latitude and longitude information.

18. The non-transitory computer-readable medium of claim 13, wherein the calendar information comprises appointments of the subscriber.

19. The non-transitory computer-readable medium of claim 13, wherein the communication activities comprise phone call activities, email activities, and text messaging activities.

20. An apparatus for updating a social network profile, the apparatus comprising:
   a processor; and
   a computer-readable medium storing a plurality of instructions which, when executed by the processor, cause the processor to perform operations, the operations comprising:
      receiving rich presence information associated with a subscriber, wherein the rich presence information includes location information associated with the subscriber, calendar information of the subscriber and communication activities of the subscriber;
      processing the rich presence information in accordance with a policy defined by the subscriber, wherein the policy defines a level of abstracting to produce an update about the subscriber;

abstracting specific information in the update into general information to generate a modified update, wherein the abstracting transforms the specific information into the general information; and publishing automatically the modified update about the subscriber on the social network profile associated with the subscriber.

\* \* \* \* \*